Z. T. Sweet,

Gang Plow.

No. 85,621. Patented Jan. 5, 1869.

Witnesses:
Inventor:
Z. T. Sweet

United States Patent Office.

Z. T. SWEET, OF EUGENE CITY, OREGON.

Letters Patent No. 85,621, dated January 5, 1869.

IMPROVEMENT IN GANG-PLOWS.

The Schedule referred to in these Letters Patent and making part of the same.

*To all whom it may concern:*

Be it known that I, Z. T. SWEET, of Eugene City, in the county of Lane, and State of Oregon, have invented a new and useful Improvement in Gang-Plows; and I do hereby declare that the following is a full, clear, and exact description thereof, which will enable others skilled in the art to make and use the same, reference being had to the accompanying drawings, forming part of this specification, in which—

Similar letters of reference indicate like parts.

This invention relates to a new and improved gang-plow, of that class which are provided with a driver's seat, and are commonly termed sulky-plows.

The invention consists in the combination of devices, whereby the plow-beams are raised and lowered by the foot of the driver.

It also consists in the arrangement of the lever for raising and lowering the axle and frame of the cultivator, with reference to the wheels, whereby the weight of the frame locks the lever in any desired position.

In the accompanying sheet of drawings—

A represents an axle, which is mounted on two wheels, B B', and has two parallel bars, $a\ a$, secured to it, between the front ends of which the draught-pole C is secured.

One of the wheels, B, has its arm, $b$, attached to a slide, $c$, which is fitted in an upright guide, $d$, attached to one end of the axle A, and D is a lever, of bent or right-angular form, which has its fulcrum-pin, $e$, in an upright, $f$, on the axle.

Figure 1:
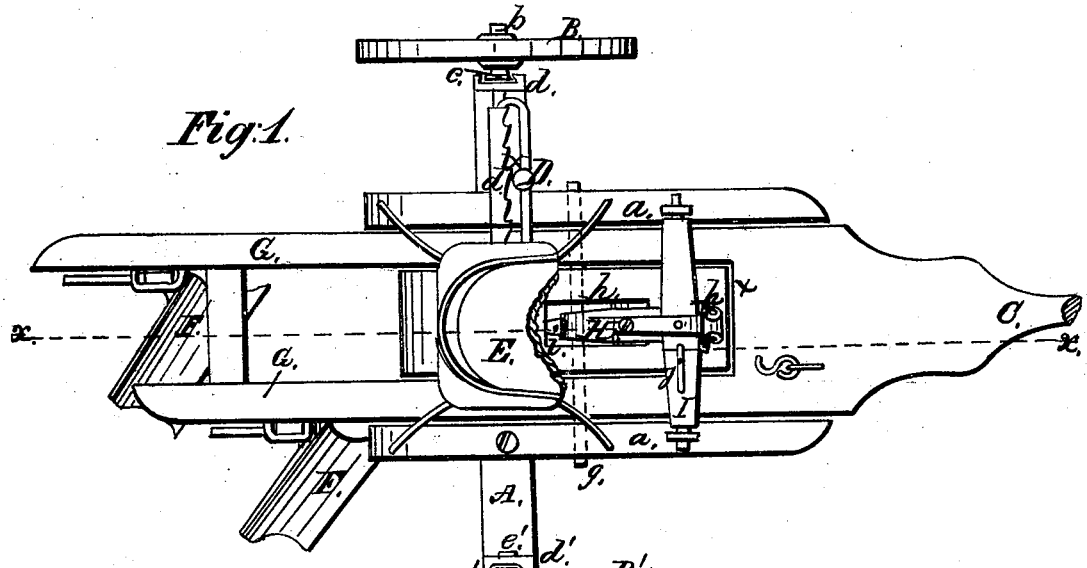
Figure 1 is a plan or top view of my invention.
Figure 2:
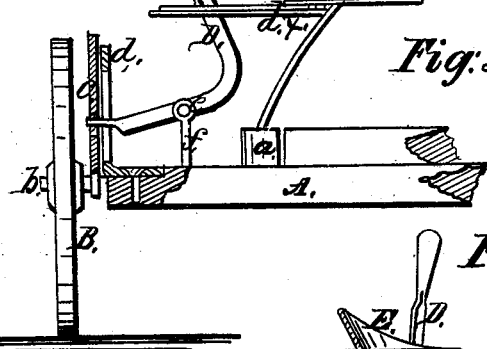
Figure 2 is a rear view of a portion of the same, partly in section.

One arm of this lever is fitted in the slide $c$, and the other arm extends upward, within convenient reach of the driver on his seat, E, the lever being retained in position at any point within the scope of its movement by a rack, $d^\times$, shown clearly in fig. 1.

It will be seen that the weight of the frame forces the lever inward to engage with the rack $d^\times$, and that consequently the lever is locked in any desired position by means of such weight.

This wheel B is the land-wheel, and it will be seen that by the arrangement described it may run on a higher plane or level than the other or furrowed wheel, B', and the machine and plows kept in a horizontal position.

The wheel B' also has its arm, $b'$, attached to a slide, $c'$, fitted in a guide, $d'$, but the slide $c'$ is secured in its guide, $d'$, at a greater or less height, by a screw-bolt, $e'$, as this wheel does not require to be adjusted frequently, but only at the commencement of work, and according to the depth of furrow required.

The land-wheel B, however, may require to be adjusted, or, more strictly speaking, the side of the machine near said wheel may require to be raised or lowered quite frequently, especially when uneven ground is being plowed, in order that the machine may work horizontally.

F F represent the plows, which are attached to beams G G, which work on a bolt, $g$, the latter passing through the bars $a\ a$.

Figure 3:
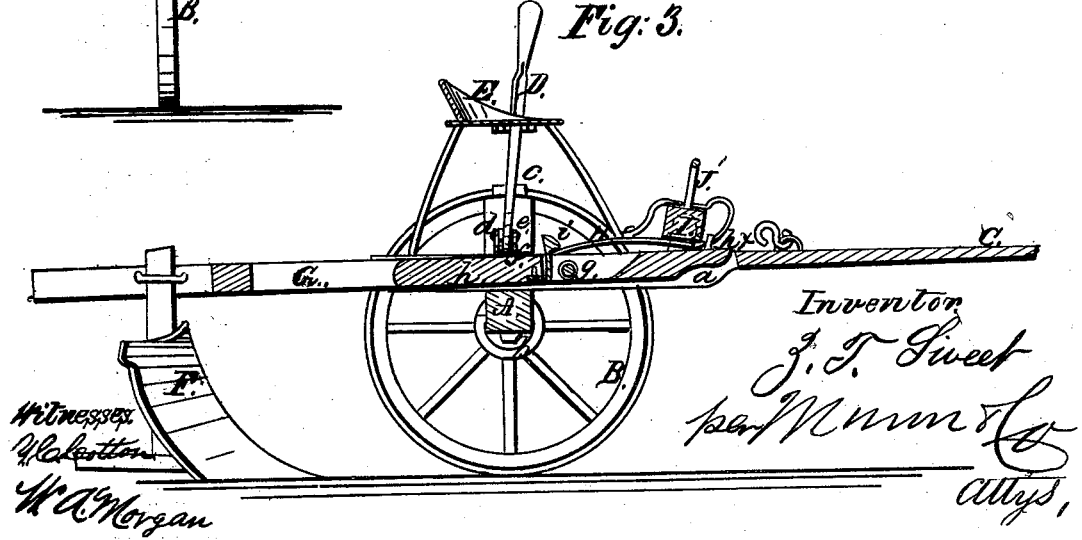
Figure 3 is a side sectional view of the same, taken in the line $x\ x$, fig. 1.

To a cross-bar, $h$, between the beams G G, there is secured a catch, $i$, shown clearly in fig. 3.

H is a spring, which is attached to a shaft, I, and to the cross-bar $h$, by a staple, $h^\times$.

The bearings of this shaft I are on the bars $a\ a$.

This shaft has a foot-piece or lever, $j$, attached to it, and the rear end of the spring H engages with the catch $i$.

This spring, when the driver presses his foot down upon it, keeps the plows to their work.

By relieving the spring of the pressure of the foot, and pressing the latter against the foot-piece or lever $j$, the plows F may be raised.

The arrangement is extremly simple and efficient, and may be constructed at a small cost.

Having thus described my invention,

I claim as new, and desire to secure by Letters Patent—

1. The combination of the cam-spring H, rock-shaft I, foot-piece $j$, and staple $h^\times$, with the side bars $a\ a$, block $h$, catch $i$, and beams G, all arranged and operating as described, for the purpose specified.

2. The arrangement of the rack $d^\times$ and the angular lever D with the slotted guide-plate $d$ upon the axle, and the slide $c$ upon the arm $b$ of the wheel B, whereby the weight of the cultivator holds the lever locked in any desired position, as herein shown and described.

Z. T. SWEET.

Witnesses:
J. B. UNDERWOOD,
A. A. SMITH.